Nov. 6, 1934. J. J. ARMSTRONG Re. 19,359

FILTER UNIT

Original Filed Dec. 3, 1928 5 Sheets-Sheet 1

INVENTOR.
John J. Armstrong.
BY
Townsend, Loftus & Abbett
ATTORNEYS.

Nov. 6, 1934. J. J. ARMSTRONG Re. 19,359

FILTER UNIT

Original Filed Dec. 3, 1928 5 Sheets-Sheet 2

INVENTOR.
John J. Armstrong
BY
Loussend, Loftus & Abbett
ATTORNEYS.

Nov. 6, 1934. J. J. ARMSTRONG Re. 19,359

FILTER UNIT

Original Filed Dec. 3, 1928 5 Sheets-Sheet 3

INVENTOR.
John J. Armstrong.
BY
Townsend, Loftus & Abbott
ATTORNEYS.

Nov. 6, 1934. J. J. ARMSTRONG Re. 19,359

FILTER UNIT

Original Filed Dec. 3, 1928 5 Sheets-Sheet 4

INVENTOR.
John J. Armstrong.
BY
Townsend, Loftus & Abbett
ATTORNEYS.

Nov. 6, 1934. J. J. ARMSTRONG Re. 19,359

FILTER UNIT

Original Filed Dec. 3, 1928 5 Sheets-Sheet 5

INVENTOR.
John J. Armstrong.
BY
Townsend, Lytle & Allett
ATTORNEYS.

Reissued Nov. 6, 1934

Re. 19,359

UNITED STATES PATENT OFFICE 19,359

FILTER UNIT

John J. Armstrong, Crockett, Calif., assignor, by mesne assignments, to E. D. Eggimann, Fort Wayne, Ind.

Original No. 1,792,797, dated February 17, 1931, Serial No. 323,307, December 3, 1928. Application for reissue February 6, 1933, Serial No. 655,534

6 Claims. (Cl. 210—169)

My present invention relates to filters and more particularly to a new and improved type of filter element which is particularly well suited to filter presses of the present existing types, wherein it is desired to filter and backwash under high pressures.

Mechanical filtration, when applied to a liquid, may be defined as the separation of the suspended insoluble particles by straining through some porous or permeable medium, such as woven cotton, duck, jute, or burlap fabrics, finely woven metal screens and other porous materials, which allows the liquid to pass through while retaining or arresting the entrained solids. This medium, after the filtering operation is begun, gradually ceases to be the actual filtering medium as the solid deposits collect and retained on its surface in the form of a cake of sludge assume this property, thus acting, so to speak, as a natural filter aid.

In the following description the liquids, after passing through the filtering medium, will be referred to as "filtrate", while the separated solids retained on the surface of this medium will be termed "precipitate". Although the precipitate deposited on the surface of the filter becomes the actual filtering media, it is obvious, nevertheless, that the size of the openings in the filter is the ultimate measure of the degree of fineness of the filtration, for extremely fine particles of solid matter will pass through the interspaces of the precipitate, together with the filtrate and on through the mesh of the filter if the openings in same are not small enough to prevent their passage.

I have found, however, that an unusually high degree of filtration out of all proportion to the size of the filtering passages may be accomplished by forming filtering passages of unusually small microscopic dimensions but having appreciable length. Microscopic channels have capillarity and it is thought that capillary action may have something to do with the unexpectedly fine results accomplished in filtration through small microscopic channels under pressure.

An important object of my present invention is to provide a very strong and substantial type of filter element for mechanical filtration purposes, which, owing to its design and construction, may be made to withstand extremely high filtering pressures and at the same time present very minute or even microscopic apertures or openings for the passage of the filtrate.

Another object of my invention is to provide a filtering medium or element that will, owing to its design and construction, withstand or resist backwashing pressures as high or higher than the filtering pressures, without danger of injury to same.

It is a further object of my invention to provide a filtering media, the design of which makes unnecessary the use of any of the well known present day filtering mediums now in use for this purpose, such as cotton duck, metallic woven fabric, and other porous material. In practice, this filter element may be made to filter at exactly the same rate as with any of the filtering media heretofore employed in filtering and the filter unit of my present invention may be constructed to secure any predetermined degree of surface permeability even to making the pores or mesh of same so small or minute that bacteria of the smallest size can be held back, thus making the filtering element suitable for the separation of the finest particles. In other words, this type of filter layer or medium may be designed and constructed to secure filtering results finer than those secured by using permeable brick or other porous mineral medium. Moreover the filtering element of my present invention may be made of metal or similar material, so that high or extremely low filtering temperatures will not injure or effect same, and further, the filtering elements or leaves may be made of any material suitable for filtering acid or alkaline solutions which solutions are extremely destructive to vegetable or animal fibre filtering cloths.

Another object resides in the method of filtering by forcing the fluid to be filtered through capillary passages.

Among the other objects of the invention is to employ a filter comprising a tightly and spirally wound ribbon of impervious material wherein the fluid to be filtered is forced through microscopic spaces forming capillary passages between tightly wound ribbon layers; to provide a filter comprising channels having a microscopic dimension and of appreciable length through which fluid may be filtered by capillarity; to provide a filter unit comprising a multitude of microscopic capillary filtering passages through which the liquid to be filtered may be forced under pressure; to provide a filter unit having microscopic filtering channels so arranged to substantially prevent clogging of the channels; to provide a filter unit having a multitude of microscopic filtering channels and formed in a simple manner to facilitate construction of the unit, the design providing a sturdy structure adapted to prevent buckling of the unit under the high filtering pressures employed; to provide a filter unit comprising a plurality of stacked laminations such as may be formed by winding a ribbon of material spirally upon itself and with a multitude of microscopic filtering passages between adjacent laminations, said passages being formed to permit the fluid being filtered, to be forced through the microscopic passages so provided in the stacked laminations.

Another important object is to provide a filter of the so-called disk-type comprising a coiled ribbon in which a surface of the ribbon is provided with grooves having a microscopic dimension and extending laterally across the surface of the ribbon to provide filtering channels when the ribbon is wound spirally to disk form.

Another important object resides in the method of filtration by forcing the fluid to be filtered into a filtering unit from the opposite sides thereof and draining the filtrate from the interior of the unit.

Another important object resides in the method of filtration by forcing the fluid to be filtered through channels having a microscopic dimension.

Still another object of the invention resides in providing a filter unit of the disk type comprising tightly wound laminations of ribbon-like material having microscopic filtering channels formed between adjacent laminations of the unit and extending from a face of the disk and connecting with an internal passageway formed within the disk by perforations arranged in spaced apart relationship in the ribbon-like material whereby the liquid to be filtered may be forced under high pressure through the filtering passages between adjacent laminations in an axial direction and be delivered into the central channel and then flow in a radial direction.

Still another object of this invention is to provide a filtering medium or element that is easily adaptable for substitution and use in any of the standard types of pressure and certain types of vacuum filters and one that will readily lend itself to function in exactly the same manner during the filtering cycle as the leaves or filtering elements now used in these filters.

Another and important object of my present invention is to provide a filtering element or filter, the design and construction of which is such that the filtering operation or cycle may be greatly increased as to time. This is brought about by the fact that the proposed filtering media is adaptable to withstand extremely high filtering pressures, thus making it possible to start the filter cycle at a low or moderate pressure and continuing same up to and including a very high final pressure, resulting in a greatly increased, as well as prolonged, filtrate flow.

Other objects and advantages of my invention other than those stated above, together with certain inherent advantages, will be in part obvious and in part specifically referred to in the course of the following description taken in connection with the accompanying drawings, in which—

Figure 15:
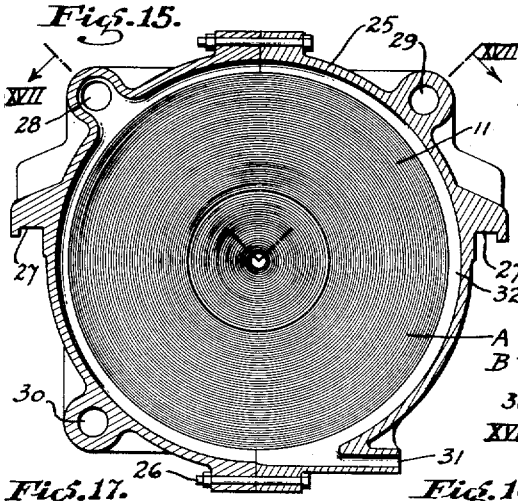
Figure 16:
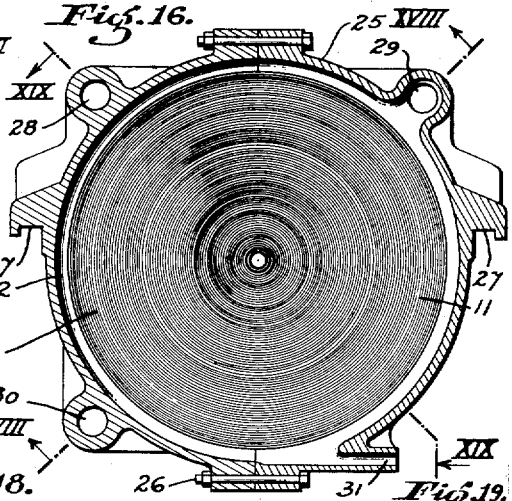
Figure 17:
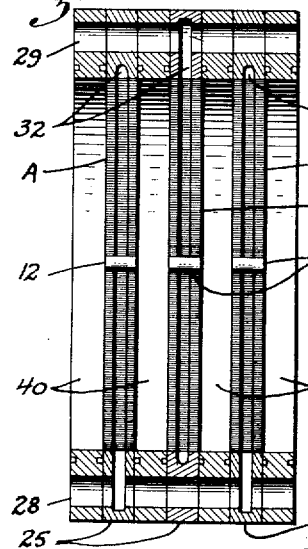
Figure 18:
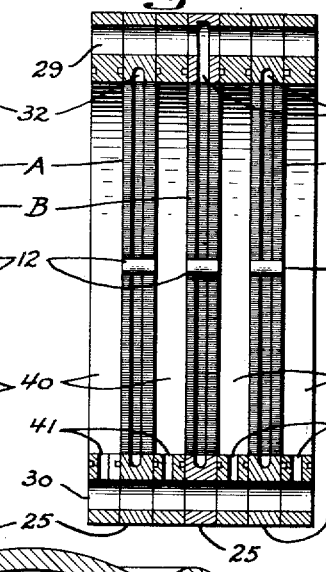
Figure 19:
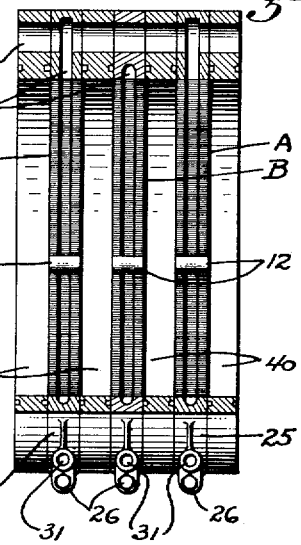
Figure 20:
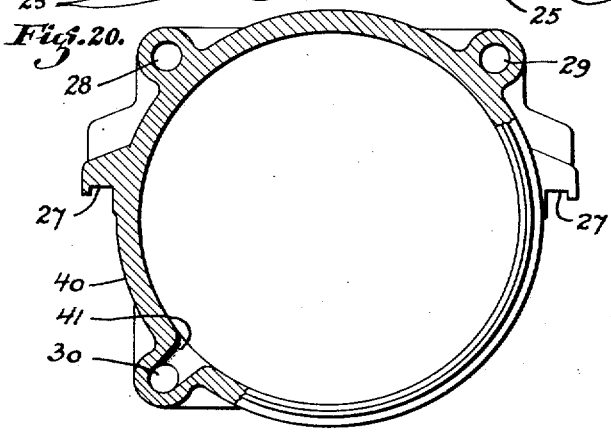
Figure 21:
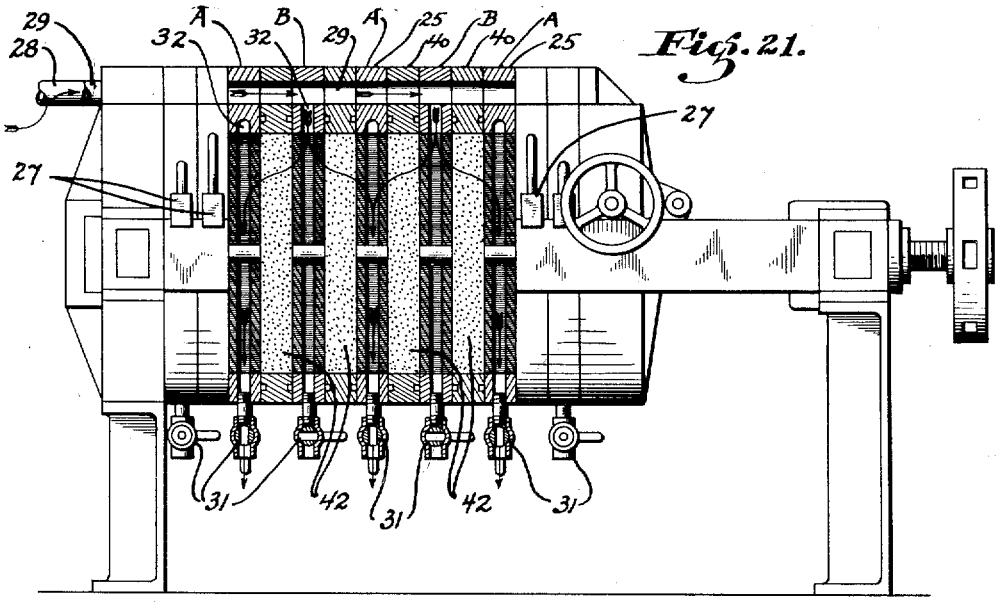
Figure 22:
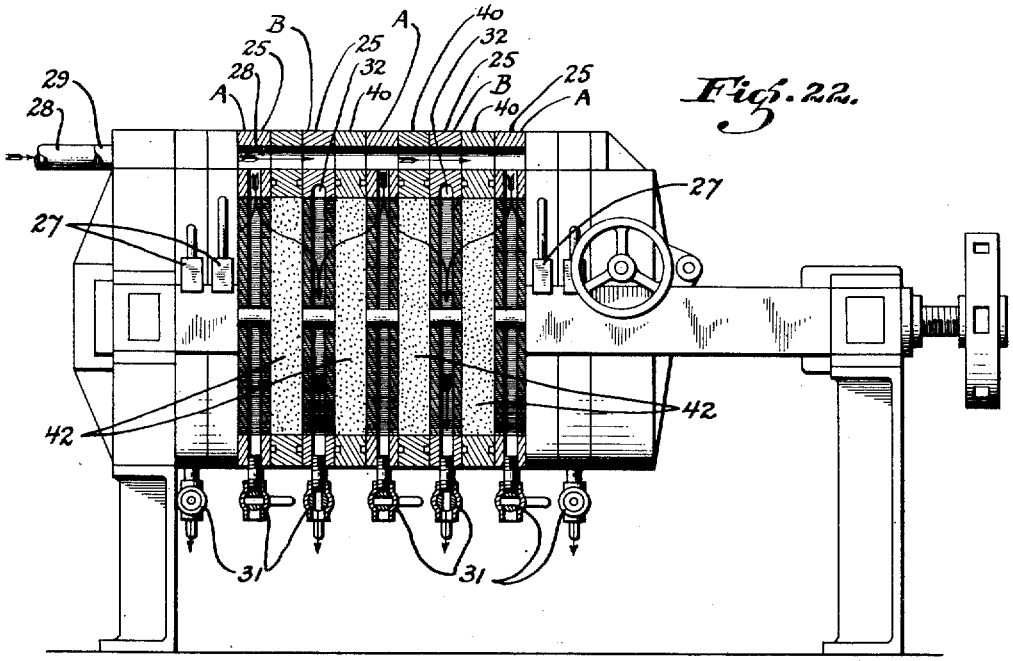

Figures 11, 12, 13, and 14 are fragmentary, enlarged views of portions of different shapes of ribbon material suitable for my invention;

Figures 15 and 16 are side elevations, partially in section, showing my invention applied to frames suitable for a filter press having two backwash channels;

Figure 17 is a developed, sectional view taken along line XVII—XVII of Figure 15;

Figure 18 is a sectional view taken along line XVIII—XVIII of Figure 16;

Figure 19 is a sectional view taken along line XIX—XIX of Figure 16;

Figure 20 is a side elevation, partially in section, showing a spacing unit suitable for use in connection wtih my filter plates when applied to a filter of the press type; and Figures 21 and 22 are side elevations, partially in section, of assembled filter presses with my improved filter mounted therein.

To illustrate my invention, I have shown in the drawings a filter comprising an annular frame or support 10, which is adapted to be clamped and hold a roll of ribbon or tape spirally wound to form a disk.

The ribbon 11 is shown as wound upon a core member 12 and the frame member 10 is provided with adjustable means in the form of clamping screws 13 by means of which the ribbon 11 is securely held. Extending centrally around the inner face of the support 10 there is provided a groove 14. This groove 14 terminates in an outlet 15 by means of which suitable conduit couplings may be made when the filter unit is in operation. The ribbon 11 is also provided with spaced perforations 16 which will be referred to in greater detail hereinafter. At this point it will be sufficient to say that these perforations 16 are of such dimensions and so arranged that when the ribbon is wound up spirally to form the disk, the perforations 16 will overlap and establish within the disk a multiplicity of conduits which extend outwardly between the surfaces of the disk and connect with the annular groove 14 previously referred to as formed in the frame member 10. In this construction it will be understood that the perforations, due to varying diameters of the convolutions thereof, will not register regularly with each other to form continuous or radial channels, but it will be readily understood that in any event, sinuous or irregular channels will be formed thereby and, in order to insure of this result being obtained, I propose to make the perforations in the ribbon 11 of a length greater than the intervening web of material so that, even though the channels are sinuous or irregular, a free conduit for the exit of the filtrate either toward the center of the filter element or toward the periphery of the same will be possible. Filtration with this type of filter element will be carried out by drawing or forcing the liquid to be filtered through both flat sides of the filter element and between the turns of the spirally wound ribbon or tape into the channels through which, as before stated, the filtrate will travel in an irregular path toward the periphery of the filter element, and out through the outlet 15 via the groove 14.

To accomplish this purpose the fluid may be forced under pressure between the layers of the disk and into the central channels, or a vacuum pump may be attached to the outlet 15 to reduce the pressure within the channels so as to draw the filtrate between the layers of the disk. That is to say, the atmosphere within the tortuous channels is rarified and the fluid is sprayed into the atmosphere through the microscopic filtering openings between the layers of ribbon forming the filtering disk.

Figure 3:
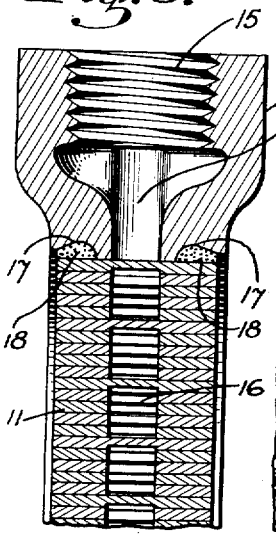
Figures 3 and 4 are enlarged fragmentary sectional views taken from Figures 1 and 2 showing the arrangement of the parts in greater detail.
Figure 4:
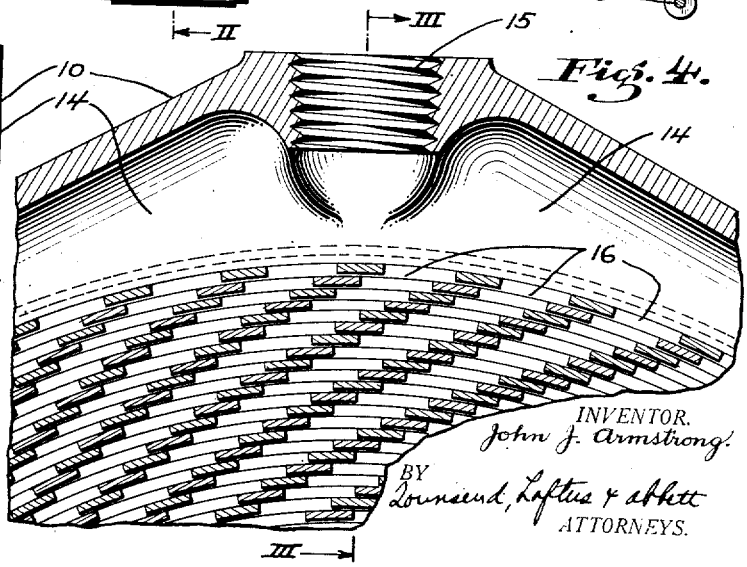

By referring particularly to Figure 3 of the drawings, it will be seen that I have illustrated the frame 10 as having, in addition to the annular groove 14, other grooves or recesses 17. These recesses 17 are provided where found necessary for the purpose of receiving a suitable calking or packing material by means of which a tight fit may be obtained between the outer turn of the spirally wound ribbon and the frame 10.

Figure 5:
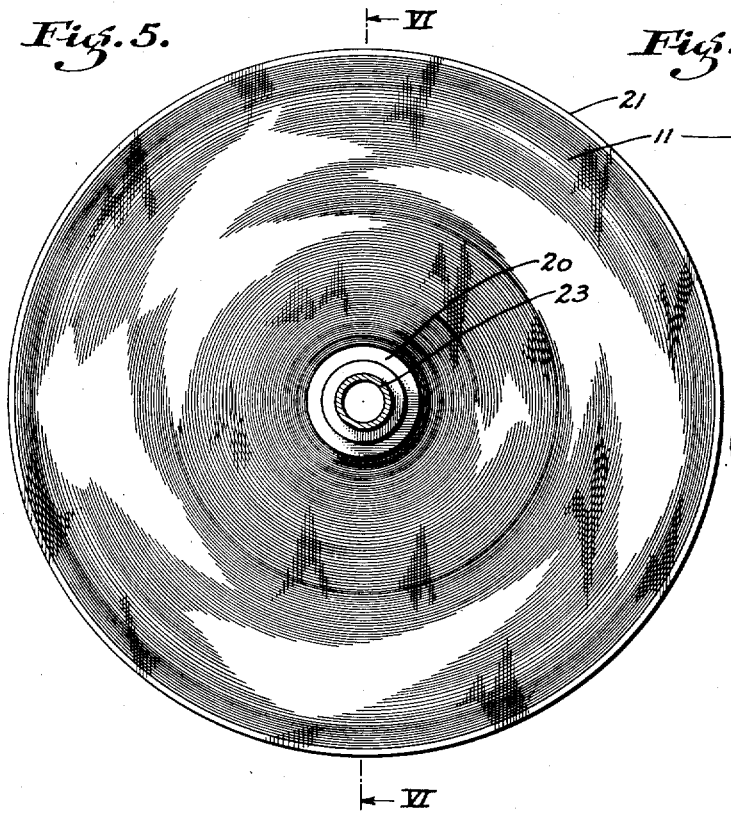
Figure 5 is a modified form of my improved filter element.
Figure 6:
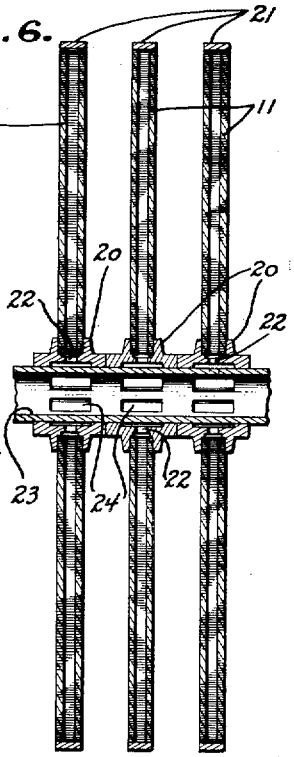
Figure 6 is a sectional view taken along line VI—VI of Figure 5, showing a plurality of these filter elements as they are assembled in operation.
Figure 7:
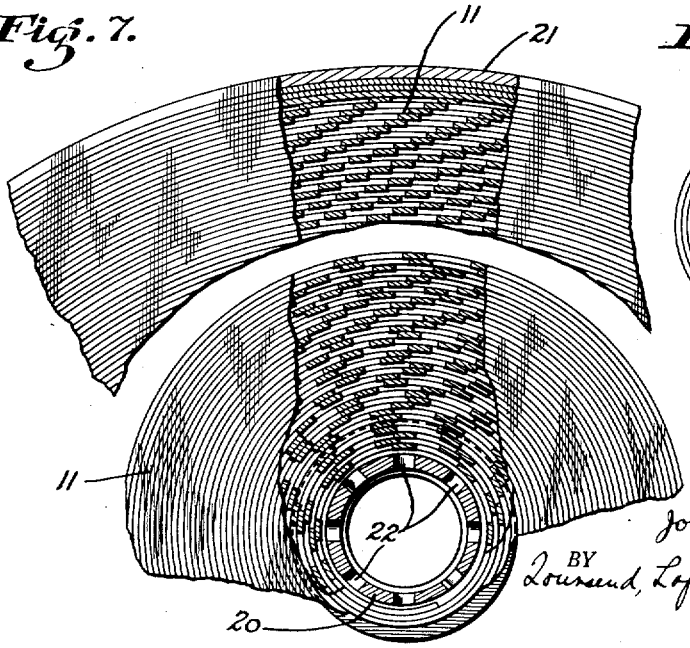
Figure 7 is an enlarged fragmentary view of the filter element shown in Figure 5.

Another simple form of my present invention is illustrated in Figures 5, 6, and 7 of the drawings. In this embodiment of my invention, the ribbon 11 is shown as spirally wound upon a hub or spider 20 and is secured thereupon so as to form a disk by means of an outer band 21 which may be shrunk thereupon so as to hold the turns tightly together. In this embodiment of my invention, the hub 20 is provided, as shown in Figures 6 and 7, with an annular recess from which a plurality of openings 22 extend. These openings 22 are adapted to form a connection between the interior of the hub 20 and the channels formed by the perforations previously referred to as located in the ribbon 11.

This embodiment of my invention is particularly well suited to filter units of the central outlet and rotary types and, when in operation, the filter units will be mounted in spaced relation upon a tubular supporting conduit 23, as illustrated in Figure 6, the member 23 being provided with suitable openings 24 therethrough which align and form with the openings 22 a path for the filtrate from the interior of the ribbon disk to the annular conduit or support 23 and out of the filter unit.

Figure 8:
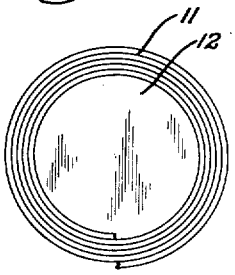
Figure 8 is an enlarged, fragmentary view showing a detail of the type of filter contemplated by my invention.

In Figure 8 of the drawings I have illustrated in detail the particular manner of starting the ribbon upon the core member 12 and the hub 20. In this illustration it will be seen that the outer surface of these members against which the first turn of the ribbon 11 is started is formed as a spiral so that all subsequent turns will lie perfectly flat upon each other throughout their complete circumference, it being understood that the pitch of this spiral is substantially equal to the thickness of the ribbon material to be wound thereupon.

Figure 1:
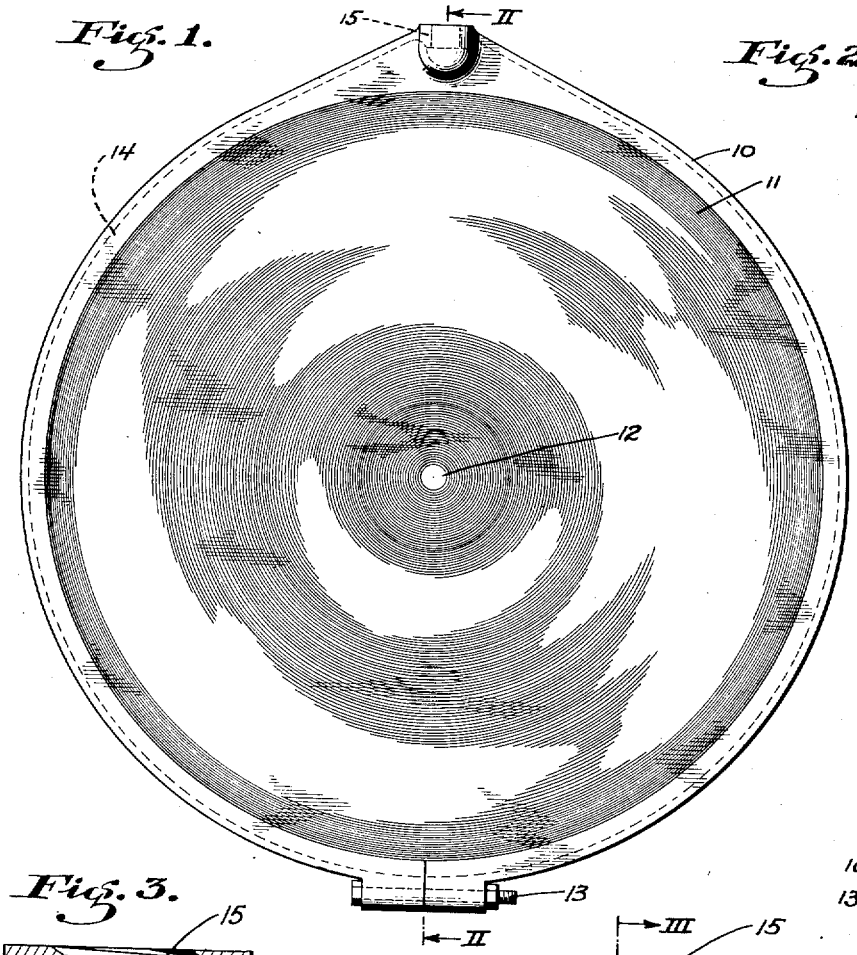
Figure 1 is a side elevation of a simple form of my improved filter.
Figure 2:
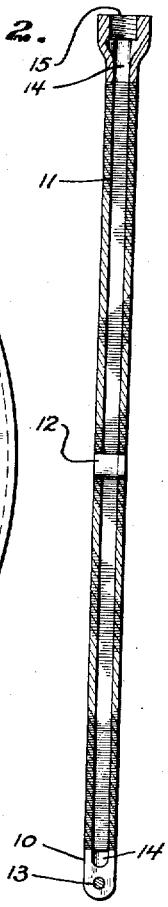
Figure 2 is a sectional view of the filter shown in Figure 1 taken along line II—II.
Figure 9:
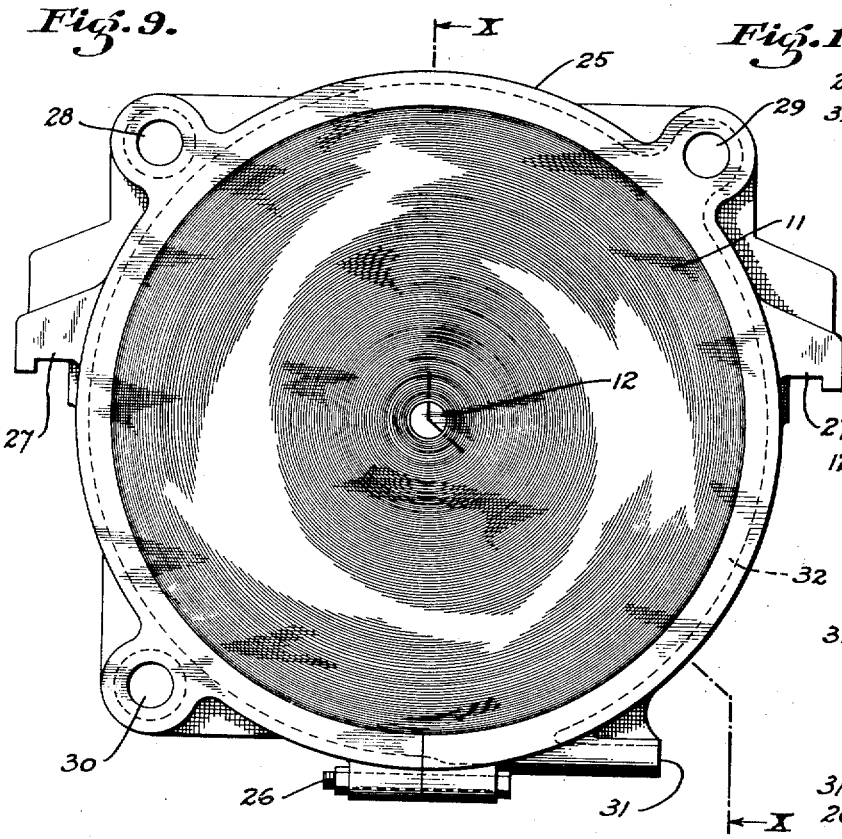
Figure 9 is a side elevation of a filter element suitable for application in a filter press.
Figure 10:
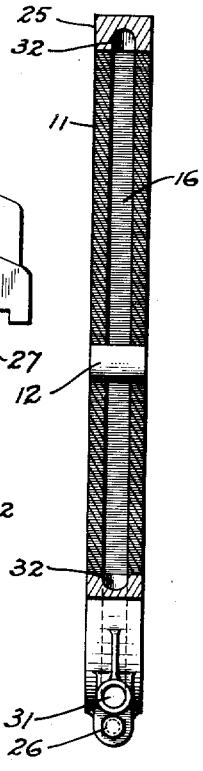
Figure 10 is a sectional view of the filter shown in Figure 9, taken along line X—X.

In order to provide a filter element embodying my invention which will possess all of the advantageous features of present day types of filter plates wherein thorough filtering and backwashing is available as is now present practice in filters of the press type, I may provide a frame or support of the type illustrated in Figures 9 and 10. This frame is designated by the numeral 25 and is shown as provided with a clamping screw 26 which operates in any manner similar to that described in connection with Figure 1 of the drawings. The particular frame or support here illustrated is provided with projecting lugs 27 on either side thereof which are adapted to rest upon the side bars of the press frame and it is also provided with wash channels 28 and 29, an inlet channel 30, and a filter cock outlet 31. The channels 28, 29, and 30 are formed in projections upon the frame 25 and the filter cock outlet 31 is located centrally of the frame and communicates with an annular groove 32 similar to the groove 14 previously referred to in connection with the description of Figure 1. This annular groove 32 is adapted to communicate with either of the wash conduits 28 and 29, as will hereinafter appear, and the inlet conduit extends directly through the frame member 25 and establishes a conduit to the interior of the press by means of conduits formed in the filter plate spacing members, as will be described more fully hereinafter in connection with Figure 20 of the drawings.

Before entering into a description of the particular type of ribbon and the design of perforations therethrough in connection with the illustrations shown in Figures 11, 12, 13, and 14, attention is directed to the following features. In these figures of the drawings I have shown several different types of shapes which the ribbon, as contemplated by my invention, may take. It will be readily understood that a great many additional shapes may be provided, but in order to reduce the number of figures I shall confine myself to the four here illustrated and although it has been stated that the ribbons entering into the construction of the various types of filter elements may be made of any suitable material, I shall here presume that the ribbons here illustrated are composed of a suitable metal as it will be readily understood that these various formations can be best formed with such a material.

Although the several designs of perforated strips or tapes entering into the construction of the various forms or types of filter elements previously described, may be made with smooth or plain surfaces such as would be secured by forming same from ordinary commercial sheets of rolled metal or other suitable material, it has been found that elements so made are suitable for successful use only in connection with very high filtering pressures. This is due to the fact that the turns making up the filtering surface of any particular filtering medium, especially when these are made of metal, must be wound and held together at a pressure sufficient to insure uniform openings or apertures between the surfaces of same for the passage of the filtered liquid or filtrate, the filtering pressures increasing as these openings are decreased and decreasing as these openings are increased, as is the case with ordinary woven wire or fibrous filtering media.

If it is attempted to reduce the filtering pressure by reducing the tension upon the turns beyond a certain critical point, cloudy filtrate will issue from the filter owing to the fact that the various turns do not open up uniformly or evenly. That is, the amount of opening or space secured by increasing the distance between the adjacent turns is not uniformly distributed between the various intermediate turns, but may be, and generally is, distributed irregularly between several or more of the turns.

In order to secure uniform and even filtration as well as clear filtrate, it is essential that the opening between the turns be kept rigidly and permanently uniform regardless of the size of same, and although a very limited amount of flexibility is available for varying the filtering pressure by decreasing or increasing the space between turns by reducing or increasing the pressure as by varying the tension at which the ribbon is wound. The foregoing applies more particularly to ribbons or turns made of some hard or rigid material such as metal, but not to the same limited extent when the ribbon is made of paper or other flexible or pliable material, as a somewhat greater range of filtering pressure adjustment may be obtained with the latter materials by varying the tension on the ribbon owing to the fact that the convolutions will open more evenly and uniformly when made of softer materials than would be the case when harder materials are used. It should be understood, however, that when extremely high filtering pressures are to be used, all types of filtering mediums should be built up preferably of metal or of a material having a high tensile and compressive strength in order to withstand high filtering as well as high backwashing pressures. Extremely high filtering pressures are obtained in this type of filter by winding the turns tightly together so that the space or opening between same for the passage of the filtrate is formed by and due solely to the microscopic channels formed by the irregularities of the surface of the turns; in fact, the convolutions may be made to contact each other so tightly and firmly that pressures up to 100 atmospheres or over will be required to force the filtrate between same. Pressures of this magnitude are, however, very seldom required in connection with industrial filtration, and in order that the filter element or medium of the types under consideration may function or filter at average or normal pressures, positive and dependable means have been provided and incorporated in the design and construction of same for keeping the turns spaced permanently and evenly apart, and at any predetermined degree, or at a degree corresponding to any desired permeability of net filtering area, resulting in a very uniform filtering media having substantially rectangular or parallel openings, thus making the filter, as previously stated, readily adaptable for substitution in place of any of the present standard filtering mediums, such as metallic fabric or other woven materials.

Figure 11:
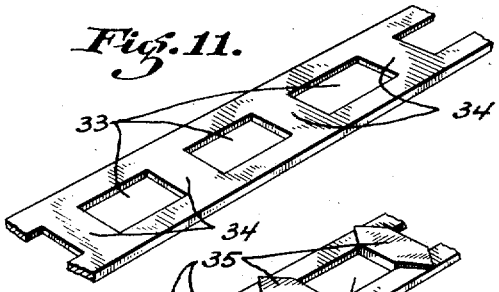

The particular type of ribbon illustrated in Figure 11 is of the simplest form. In this type of ribbon the apertures, which I have here designated by the numeral 33, are rectangular in shape and have a length substantially twice that of the web 34 at the ends thereof. By making these apertures rectangular in this manner and of a length greater than the web 34, it will be seen that there will be no possibility of these webs blanking out an aperture and thus interfering with the formation of a continuous passageway extending radially through the disk formed as above suggested. In the particular modification shown in Figure 12, the webs 34 are shown as of a thickness somewhat less than that of the edges of the ribbon so that when the ribbon is wound to form the disk, the webs will not contact with each other and, as a result, it will be seen that, in addition to forming radially extending channels, a ribbon of this type will also form substantially annular channels within the interior of the disk. When ribbons of the types illustrated in these two latter figures of the drawings are used, it will be seen that the clearances between the successive turns of the spiral will be determined by the nature of the engaging surfaces and also the tension under which the ribbon is wound. Ribbons constructed in accordance with these two embodiments of my invention will be found particularly suited to filters wherein a very fine filtering surface is desired.

Figure 13:
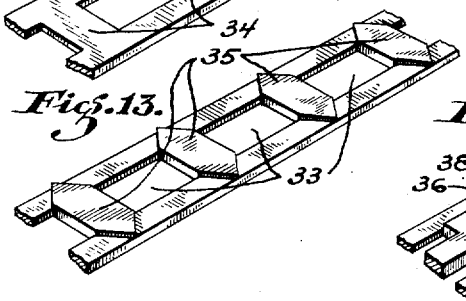
Figure 14:
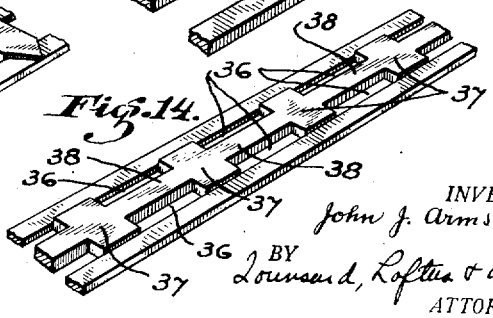

If it is desired to provide a filter of the coarser type, this may be accomplished in accordance with my invention by providing the ribbon with raised surfaces thereupon which will operate to space the edges of the ribbon to any desired degree. In Figures 13 and 14, I have shown two types of such ribbons. In Figure 13 the webs, which I have designated by the numeral 35, are shown as of a greater thickness than the ribbon proper so that when the ribbon is wound, these raised webs 35 will contact with the next adjacent surface of the ribbon and with themselves so as to uniformly space the edges of the ribbon and thus provide a filter opening of any desired degree, depending upon the relative difference of thickness between the ribbon proper and the webs. With a ribbon of this type, it will be seen that in order to obtain a uniform spacing of the edges of the ribbon, it will be necessary that the webs become superimposed upon themselves; otherwise these webs, if they do not contact with another web, will tend to compress the turns of the ribbon therebetween. However, this construction will be particularly well suited to a great many types of apparatus. If, however, it is desired to produce a filter in accordance with my invention in which the spacing between the convolutions of the ribbon will be uniform throughout their circumference, this can be accomplished by providing a ribbon of the type illustrated in Figure 14. In this embodiment the ribbon is shown as provided with two apertures 36 between webs 37. These webs 37 are shown of a greater thickness than the edge or filter forming portions of the ribbons and are connected together by a centrally extending portion 38 which is of the same thickness as the web. With a ribbon of this construction it will be readily seen that when it is wound up, as previously suggested, the webs 37 and the central partition 38 will always contact with each other and that the outer edge or filter forming portion of the ribbon will never contact with an adjacent turn thereof.

Figure 12:
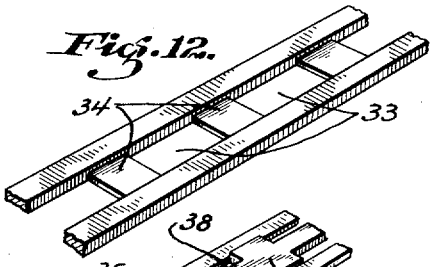

In Figures 12, 13, and 14, the showing of the ribbon especially with respect to the thickness of the ribbon and of the spacing elements 34, 35, and 37 is somewhat exaggerated and it should be understood that the differential in thickness between the spacing bars 35 and the ribbon is extremely small. The overall thickness of a lamination, that is to say, of the ribbon including the bars 35 and 37, is in the neighborhood of one one-thousandth part of an inch so that the space between the edge of one lamination and that of the overlying lamination will be of microscopic size so that the disc provided by winding a ribbon of the type illustrated in Figures 13 or 14 will provide channels or canals of relatively large size by the overlapping of the openings 33 and 36 and access to these central canals may be had from the opposed side surfaces of the filtering unit through the microscopic filtering channels defined between the spacing elements 35 and 37 and the edges of adjacent overlying layers of the ribbon which are maintained in microscopically spaced apart position by means of the spacing bars or elements 35 and 37. It will thus be seen that the filtering unit provides a plurality of filtering channels extending from the surface of the disc to the internal channels, which filtering channels have a microscopic dimension and being of substantial length determined by the width of the ribbon between the perforations 33 and 36 and the edge of the ribbon. When fluid to be filtered is applied under pressure to the opposed surfaces of the filter unit, it will flow inwardly through the microscopic filtering passages and into the central channels provided by the perforations of the ribbon and I have found that an unusually effective filtration is thus provided which apparently is the result of the capillary action of microscopic channels. By applying the fluid to be filtered under pressure on opposite sides of the filtering unit, any tendency to buckle the unit will be offset for the reason that the same pressure is applied on opposite sides of the disc so that there is no tendency to bulge the disc laterally. Obviously the filtration may be accomplished by forcing the fluid under pressure into the internal channels provided by the perforations of the ribbon and permitting the filtrate to flow outwardly through the microscopic filtering channels. However, I prefer to accomplish filtration by passing the fluid to be filtered inwardly through the microscopic channels and then through the internal channels since this will prevent clogging the unit through the collection of relatively large particles of the filtrate in the internal channels of the unit.

Another type of ribbon which will be readily understood from a description thereof without an illustration may be made by providing upon one or both sides of a ribbon such as is illustrated in Figures 11 and 12, a series of serrations or transversely extending grooves. With such a ribbon it will be seen that when it is wound as suggested, there will remain between the adjacent turns thereof a series of small openings extending through the filter surface which communicate from the exterior thereof to the interior channels, the size and number of these openings being determined by the shape and number of serrations formed upon the ribbon.

In order that a fuller understanding of the possibilities of my invention may be had, I have illustrated in Figures 15 and 16 an assembly of two filter plates in which my invention has been incorporated. In these figures of the drawings the wash channels 28 and 29 and the inlet channel 30 are shown as formed in the supporting member, as described in connection with Figure 9 and upon close examination it will be seen that these two figures of the drawings are identical with the exception that in Figure 15 the wash channel 28 is shown as communicating with the interior of the filter disk, whereas in Figure 16 it is the wash channel 29 which communicates with the interior of the filter disk. These two different filter units or plates are designated respectively by the letters A and B for the purpose of facilitating a description of their arrangement when in operation. When a filter built in accordance with my invention is incorporated in filter plate supports possessing these characteristics, it will be possible to so assemble the plates that the two distinct wash channels 28 and 29 may be used for the purpose of creating reverse flow of wash water through the filters so that a thorough washing thereof can be carried out.

In order that a better understanding of the arrangement of filters constructed in accordance with the above, when in use, may be had, I have shown in section in Figures 17, 18, and 19 three of the filter units as they will be arranged in the filter press. In these figures of the drawings I have shown a series of the filter units of the A and B types alternately arranged with filter press spacers or frames 40 of the type illustrated in Figure 20. From Figure 17 it will be seen that the interior of the filter units A communicates with the wash channel 28 shown at the bottom of the figure and that the interior of the filter units B communicates with the wash channel 29 shown at the top of the figure; and upon reference to Figure 18, which is a section taken through the inlet conduit 30, it will be seen that this conduit 30 communicates with the interior of the press between the filter elements A and B by means of communicating conduits 41 formed in the frame members 40. In addition to the above arrangement of conduits which communicate with the interior of the respective filter units, it will be understood that an outlet is also provided for the interior of the filter units A and B in the form of the filter cock outlet 31, previously referred to in connection with Figure 9.

When the parts are thus assembled in the filter press and the press is in operation, it will be understood that the wash channels 28 and 29 will be closed. Under these conditions the material to be filtered will be forced into the press through the inlet conduit 30 where it will be discharged between the adjacent filter elements A and B. The filtrate will then pass through the apertures formed between the spiral turns of the filter disk and then flow out through the radially extending channels provided by the perforations in the ribbon and out through the filter cock outlet 31 in a manner similar to that in which filter presses of present day types now operate. At this point it should be pointed out that because of the nature and construction of my improved filter units, it will be possible to operate the filter under pressures for in excess of any pressures heretofore possible. This will be found particularly true where the filter units are formed of metallic ribbon as it will be seen that the filtering surfaces thereof will be held rigidly in position by reason of the equalizing pressures exerted on both sides thereof. This characteristic of my invention will also be found advantageous during the operation of backwashing as, under these conditions, it will also stand a higher degree of back pressure than filter units of present day types.

The provision of the wash channels 28 and 29, as previously stated, is primarily for the purpose of providing a means whereby the filters may be backwashed in order to thoroughly clean them and in connection with the operation of this aspect of my invention, reference should be had to Figures 21 and 22 wherein I have illustrated a simple type of filter press with the plates arranged in accordance with the manner disclosed in connection with Figures 17, 18, and 19. In connection with these figures of the drawings it should be stated that the sectional portions thereof are more in the nature of a schematic showing than a true section, as in these two figures the wash channels 29 and 28 are shown respectively substantially the same except with respect to their connection with the filter plates. In describing the operation of this feature, reference will first be had to Figure 21 wherein it will be assumed that it is desired to backwash the plates B. Under these conditions, the filter cocks in all the plates B will be closed and the filter cocks in the plates A will be open. Water will then be caused to flow into the wash channel 29 and into the interior of the plates B. This water will then flow outwardly between the convolutions of the ribbon and effect a thorough backwashing thereof, the water then continuing on through the filter cake, if such a medium is resorted to, and into the interior of the adjacent filter plates A, and then out through the open filter cocks attached to the latter plates. The above path of circulation is indicated by arrows upon this figure of the drawings. The dotted zone shown in these figures of the drawings and designated by the numeral 42 represents a mixture of precipitate and an auxiliary filter aid which may be of kieselguhr or any other suitable material.

After the plates B have been backwashed by circulating water through the wash channel 29, as previously described, it will then be necessary, in order to complete the washing, to backwash the plates A. This will be carried out in substantially the same manner as that described above, but in this case the filter cocks upon the filter plates A will be closed and the filter cocks on the plates B will be opened and the water, instead of being circulated through the wash channel 29, will be caused to circulate through the wash channel 28. This will cause a circulation of water from the interior of the filter plates A outwardly and into the interior of the filter plates B, as indicated by arrows in Figure 22, and thus, as a result of causing water to circulate alternately through both the wash channels 28 and 29, it will be possible to effect a thorough backwashing of the filter plates and also the precipitate 42 between the filter plates.

From the above, it will be seen that I have provided a new and novel type of filter element and, while I have illustrated several embodiments thereof which render my invention applicable to the principal and preferred types of apparatus now in use, I desire to have it understood that other combinations and arrangements of parts and application of the principles constituting my invention may be had without departing from the spirit and scope of my invention as defined in the appended claims. One variation and arrangement which suggests itself at this time is that a filter may be constructed in accordance with my invention by combining a metallic ribbon with a ribbon of fibrous material, as, for instance, paper. In this embodiment, the ribbon of fibrous material would be wound simultaneously with the metallic ribbon, so that when the filter unit is built up the adjacent convolutions will be alternately of a metal and fibrous material. With a construction of this type it will be possible to produce a filter having varying degrees of filtering ability, depending upon the type and nature of the fibrous material interposed between the turns of the metallic ribbon.

Having thus described my invention, what I claim as new and desire to secure by Letters Patent is:

1. A filter unit comprising a circular plate member having a groove formed about the inner face thereof, and a spirally wound continuous element having perforations therethrough which overlap each other and form conduits between the edges thereof which connect with the groove in said plate member, said circular plate member being contractable, and means for contracting the plate member to clamp and secure the spirally wound element against removal.

2. A filter unit comprising a circular plate member having a groove formed about the inner face thereof, and a spirally wound continuous element having equally spaced perforations therethrough which overlap each other and form substantially radially extending conduits between the edges thereof connecting with the groove in said plate member and clamping means carried by the circular plate member to secure the spirally wound element against removal.

3. A filter unit comprising a flat metallic ribbon wound upon itself spirally and forming a flat disk-shaped element, said ribbon having perforations therethrough which align to form radially extending conduits between the opposite faces of the disk so formed, and a support having a conduit connecting with said radial conduits adapted to clamp and hold said disk to form a filter plate having a filter surface on both sides of said radially extending conduit substantially as described.

4. A filter unit comprising a thin ribbon constructed of an impervious material and adapted to be spirally wound to form a circular disk, said ribbon being provided with interspaced perforations disposed centrally thereof and extending longitudinally from end to end of the ribbon, said perforations registering and forming conduits extending to the outer surface of the spirally wound circular disk, a clamping ring surrounding the spirally wound circular disk and having an annular groove formed in its inner surface in communication with the conduits in the disk, and a discharge connection on the clamping ring in communication with the annular groove and the conduits.

5. A filter unit comprising a disk-like element, said element comprising a metallic ribbon wound upon itself spirally, said ribbon having perforations forming radially extending conduits between its opposed faces, and means for supporting said element comprising support members disposed axially and circumferentially of said element whereby to secure the spirally wound ribbon and support the same in wound condition, said circumferentially extending support member overlying the outer ends of said radially extending conduits and being formed with a channel communicating with said radially extending conduits.

6. A filter unit as set forth in claim 5 wherein the circumferentially extending support member comprises means closing the outer ends of said radially extending conduits and clamps the spirally wound layers of the ribbon in place.

JOHN J. ARMSTRONG.